(12) United States Patent
Gerst et al.

(10) Patent No.: US 9,365,745 B2
(45) Date of Patent: Jun. 14, 2016

(54) PRESSURE-SENSITIVE ADHESIVE DISPERSION COMPRISING POLYMERS WITH UREIDO GROUPS OR WITH UREIDO-ANALOGOUS GROUPS AND PREPARED BY STAGE POLYMERIZATION

(75) Inventors: Matthias Gerst, Maikammer (DE); Dirk Wulff, Schifferstadt (DE); Thomas Christ, Friedelsheim (DE)

(73) Assignee: BASF SE, Ludwigshafen (DE)

( * ) Notice: Subject to any disclaimer, the term of this patent is extended or adjusted under 35 U.S.C. 154(b) by 373 days.

(21) Appl. No.: 13/443,044

(22) Filed: Apr. 10, 2012

(65) Prior Publication Data
US 2012/0261070 A1 Oct. 18, 2012

Related U.S. Application Data

(60) Provisional application No. 61/475,673, filed on Apr. 15, 2011.

(30) Foreign Application Priority Data

Apr. 15, 2011 (EP) ...................................... 11162536

(51) Int. Cl.
C09J 4/02 (2006.01)
C09J 133/04 (2006.01)
C09J 133/14 (2006.01)
C09J 4/00 (2006.01)
C09J 133/00 (2006.01)

(52) U.S. Cl.
CPC .................. *C09J 4/00* (2013.01); *C09J 133/00* (2013.01); *C09J 133/14* (2013.01); *Y10T 428/2848* (2015.01); *Y10T 428/2887* (2015.01)

(58) Field of Classification Search
CPC .......... C09J 4/00; C09J 133/14; C09J 133/00; Y10T 428/2887; Y10T 428/2848
See application file for complete search history.

(56) References Cited

U.S. PATENT DOCUMENTS

| 5,652,295 | A | 7/1997 | Baumstark et al. |
| 5,744,540 | A | 4/1998 | Baumstark et al. |
| 6,031,038 | A | 2/2000 | Baumstark et al. |
| 6,485,601 | B1 | 11/2002 | Egan et al. |
| 6,552,116 | B1 | 4/2003 | Pakusch et al. |
| 6,605,662 | B2 * | 8/2003 | Zhao et al. ..................... 524/458 |
| 2003/0125459 | A1 | 7/2003 | Wulff et al. |

FOREIGN PATENT DOCUMENTS

| EP | 0 081 083 A2 | 6/1983 |
| EP | 0 710 680 A2 | 5/1996 |
| EP | 0 822 206 A1 | 2/1998 |
| EP | 1 323 740 A2 | 7/2003 |
| WO | WO 01/54896 A2 | 8/2001 |

OTHER PUBLICATIONS

U.S. Appl. No. 13/443,284, filed Apr. 10, 2012, Gerst, et al.
International Search Report issued Jul. 27, 2012 in PCT/EP2012/056732.

* cited by examiner

*Primary Examiner* — Karuna P Reddy
(74) *Attorney, Agent, or Firm* — Oblon, McClelland, Maier & Neustadt, L.L.P

(57) ABSTRACT

A description is given of a pressure-sensitive adhesive dispersion comprising a water-dispersed polymer P1 formed by emulsion polymerization. The polymer P1 is formed from a monomer mixture comprising (a) at least 40% by weight of C4 to C20 alkyl (meth)acrylates which when polymerized as homopolymers have a glass transition temperature of $-30°$ C. or less, (b) at least 0.05% by weight of (meth)acrylate monomers having a substituent of the formula

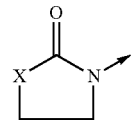

where X is $CH_2$, O, NH or NR and R is a C1 to C4 alkyl group, (c) at least 0.1% by weight of acid monomers. The polymer P1 is prepared by polymerization in at least 2 stages, the glass transition temperature of a polymer from monomers of the first stage being lower by at least $20°$ C. than the glass transition temperature of a polymer from monomers of a later, second stage.

23 Claims, No Drawings

PRESSURE-SENSITIVE ADHESIVE DISPERSION COMPRISING POLYMERS WITH UREIDO GROUPS OR WITH UREIDO-ANALOGOUS GROUPS AND PREPARED BY STAGE POLYMERIZATION

The invention relates to a pressure-sensitive adhesive dispersion comprising a water-dispersed polymer P1 formed by emulsion polymerization from a monomer mixture comprising defined C4 to C20 alkyl (meth)acrylates, defined (meth) acrylate monomers with ureido groups or with ureido-analogous groups, acid monomers, and optionally further monomers, the polymer P1 being prepared by stage polymerization.

With pressure-sensitive adhesives (PSAs) there is a desire not only for effective adhesion to the substrate but also for sufficient cohesion (internal strength) within the layer of adhesive. Adhesion and cohesion are divergent performance properties. Measures taken to improve adhesion generally lead at the same time to a deterioration in cohesion, and vice versa. Many PSAs, while having sufficient cohesion at room temperature, do not have it at elevated temperatures. Many applications, particularly in the context of adhesive tapes for the fixing of components, as in the automobile sector or the construction sector, for example, nevertheless desire high cohesion even at relatively high temperatures, without too great a deterioration in the adhesion.

WO 01/54896 and EP 822206 describe PSAs comprising polymers which are obtainable by emulsion polymerization and are prepared from, among others, (meth)acrylic monomers with a ureido group. As compared with polymers without ureido groups, these polymers lead to improved shear strength (cohesion) and to improved adhesion even at elevated temperatures. It has emerged that pressure-sensitive adhesives based on such polymers, however, do not possess sufficient water resistance on the part of the adhesive bonds produced using them. The water resistance can be measured, for example, by measuring the anchorage of the pressure-sensitive adhesive to an aluminum foil on storage in water. Aqueous polymer dispersions prepared from ingredients including (meth)acrylic monomers having a ureido group are also described in EP 710680, but pressure-sensitive adhesives are not the subject-matter.

An object of the present invention was to further improve the adhesive properties of PSAs, particularly for adhesive tapes for the fixing of components, and to achieve an even better water resistance. Accordingly, the PSA dispersions described in more detail below have been found.

The invention provides a pressure-sensitive adhesive dispersion comprising at least one water-dispersed polymer P1 formed by emulsion polymerization from a monomer mixture comprising (a) at least 60% by weight of at least one C4 to C20 alkyl (meth)acrylate which when polymerized as a homopolymer has a glass transition temperature of $-30°$ C. or less, preferably $-40°$ C. or less, (b) at least 0.05% by weight of at least one (meth)acrylate monomer having a substituent of the formula

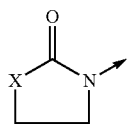

where X is $CH_2$, O, NH or NR and R is a C1 to C4 alkyl group, (c) at least 0.1% by weight of at least one acid monomer, the figures for the monomer amounts being based in each case on the sum of all monomers, and the polymer P1 being prepared by polymerization in at least two stages, the glass transition temperature of a polymer from monomers of the first stage being lower by at least $20°$ C., preferably by at least $30°$ C., than the glass transition temperature of a polymer from monomers of a later, second stage. The PSA dispersion of the invention comprises as a key constituent a polymer which is prepared by emulsion polymerization; the dispersed polymer is therefore an emulsion polymer.

In the text below, the term "(meth)acrylate" and similar terms are used as an abbreviational notation for "acrylate or methacrylate".

A PSA is a viscoelastic adhesive whose set film at room temperature ($20°$ C.) in the dry state remains permanently tacky and adhesive. Bonding to substrates is accomplished instantaneously by gentle applied pressure. A PSA dispersion is a composition which comprises a polymer, in dispersion in water or an aqueous medium, that has pressure-sensitive adhesive properties.

The polymer P1 is prepared from a first monomer type (a). Monomer type (a) is present to an extent of at least 60% by weight, e.g., from 60% to 95% by weight, based on the total amount of the monomers used for preparing the polymer P1. The monomers (a) are selected from those of the C4 to C20 alkyl (meth)acrylates which, when polymerized as homopolymers, have a glass transition temperature of $-30°$ C. or less or $-40°$ C. or less, preferably of $-45°$ C. or less. The glass transition temperature can be determined by known methods, an example being differential scanning calorimetry (see, for example, ASTM 3418/82, "midpoint temperature"). Preferred monomers (a) are $C_4$ to $C_{10}$ alkyl acrylates and $C_4$ to $C_{10}$ alkyl methacrylates, more particularly $C_4$ to $C_8$ alkyl acrylates and methacrylates. Especially preferred are n-butyl acrylate, n-hexyl acrylate, octyl acrylate, and 2-ethylhexyl acrylate, or else butadiene, and also mixtures of these monomers.

The polymer P1 is prepared from a second monomer type (b). Monomer type (b) is present to an extent of at least 0.05% by weight, e.g., from 0.1% to 5% by weight, preferably more than 1% by weight, e.g., from 1.5% to 5% by weight, based on the total amount of the monomers used for preparing the polymer P1.

Monomer type (b) is a (meth)acrylate monomer with a substituent of the formula

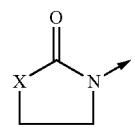

where X is $CH_2$, O, NH or NR and R is a C1 to C4 alkyl group, and the arrow on the N atom denotes the site of linkage of the substituent to the (meth)acrylate monomer. Where X is NH or NR, the monomer has a ureido group. Where X is O or $CH_2$, the monomers are termed monomers having a ureido-analogous group.

Monomers (b) are, for example, those of the formula

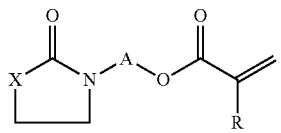

where X is as defined above, R is hydrogen or methyl, and A is a divalent linking group, preferably a C1 to C10 alkyl group or a C2 to C4 alkyl group. Particularly preferred are ureidoalkyl (meth)acrylates having 1 to 10 C atoms, preferably 2 to 4 C atoms, in the alkyl group, more particularly ureidoethyl methacrylate (UMA).

The polymer P1 is formed to an extent of at least 0.1% by weight, preferably in amounts of 0.1% to 5%, more preferably 0.2% to 4%, very preferably 0.5% to 3%, by weight, based on the total amount of monomers of the polymer P1, of acid monomers. Acid monomers are ethylenically unsaturated, radically polymerizable monomers which contain at least one acid group. Acid monomers are, for example, ethylenically unsaturated carboxylic acids, ethylenically unsaturated sulfonic acids, and vinylphosphonic acid. Ethylenically unsaturated carboxylic acids used are preferably alpha, beta-monoethylenically unsaturated monocarboxylic and dicarboxylic acids having 3 to 6 C atoms in the molecule. Examples of such are acrylic acid, methacrylic acid, itatonic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Preference is given to acrylic acid and methacrylic acid and their mixture, particular preference to acrylic acid.

The monomer mixture for forming the polymer P1 may optionally comprise further monomers (d), which are different from the monomers (a)-(c); in other words, the monomers (d) are monomers which when polymerized as homopolymers have a glass transition temperature of more than −30° C., in particular of more than −20° C., more than 0° C. or more than 20° C. Subject to these provisos, the monomers (d) may be selected from the non-(a) monomers C1 to C20 alkyl (meth)acrylates, C1 to C20 hydroxyalkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. The monomers (d) are used preferably in amounts of 1% to 40% by weight, more particularly of 2% to 30% by weight, based on the total amount of monomers of the polymer P1. Examples include (meth)acrylic acid alkyl esters with a C1-C10 alkyl radical, such as methyl methacrylate, methyl acrylate, ethyl acrylate, ethyl methacrylate. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted with chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. Hydrocarbons having 2 to 8 C atoms and one or two olefinic double bonds include ethylene, propylene, isoprene, and chloroprene. Particularly preferred as further monomers are methyl acrylate, methyl methacrylate, ethyl acrylate, styrene, C1-C10 hydroxyalkyl (meth)acrylates, and (meth)acrylamide, and also mixtures of these monomers. One embodiment uses 0%-5% by weight, preferably 0.05% to 5% by weight, of C1-C10 hydroxyalkyl (meth)acrylates.

In one embodiment of the invention the polymer P1 is additionally formed from at least one monomer (e) having at least one glycidyl group. In another embodiment of the invention there is a polymer blend composed of at least one polymer P1 and at least one polymer P2, the polymer P1 not being formed from monomers (e), and the polymer P2 being formed from at least one monomer (e) and optionally further monomers, but not from monomers of type (b). Also possible, of course, is a polymer blend of polymers P1 and P2 where both P1 and P2 are formed from monomers (e).

Preferred monomers (e) with glycidyl group are glycidyl (meth)acrylate (2,3-epoxypropyl (meth)acrylate). Particularly preferred is glycidyl methacrylate (GMA). If the monomer (e) is part of the monomer mixture for forming the polymer P1, then it is present preferably in an amount of 0.1% to 5% by weight, more particularly of 0.5% to 3% by weight, based on the total amount of monomers of the polymer P1. If the monomer (e) is part of the monomer mixture for forming the polymer P2, it is present preferably in an amount of 1% to 20% by weight, more particularly of 5% to 15% by weight, based on the total amount of monomers of the polymer P2.

One preferred polymer P1 is synthesized, for example, as follows from:
  60% to 95% by weight of the monomers (a)
  0.1% to 5% by weight of the monomers (b)
  0.1% to 5% by weight of the acid monomers (c)
  2% to 30% by weight of the further monomers (d) and
  0% to 5% by weight of glycidyl (meth)acrylate.

One particularly preferred polymer P1 is synthesized, for example, as follows from:
  75% to 90% by weight of the monomers (a)
  0.5% to 3% by weight of the monomers (b)
  0.5% to 2% by weight of the acid monomers (c)
  2% to 20% by weight of the further monomers (d) and
  0% to 3% by weight of glycidyl (meth)acrylate.

The glass transition temperature of the polymer P1 is preferably −60 to 0° C., more preferably −60 to −10° C., and very preferably −60 to −20° C. The glass transition temperature can be determined by customary methods such as Differential Scanning calorimetry (ASTM 3418/82, "midpoint temperature").

One preferred polymer P2 is synthesized, for example, as follows from:
  80% to 99% by weight of the monomers (a) and (d)
  0.1% to 5% by weight of the acid monomers (c)
  1% to 20% by weight of glycidyl (meth)acrylate.

In one embodiment of the invention the polymer P2 is formed by polymerization from a monomer mixture comprising the monomers (a), the monomers (c), glycidyl (meth)acrylate, and optionally the monomers (d), in the amounts specified for polymer P1.

The polymers P1 are prepared by what is called a stage polymerization. This is a polymerization in at least two separate stages. In an earlier (first) stage, a so-called "soft" monomer or a monomer mixture of "soft" monomers is polymerized. In a later (second) stage, a so-called "hard" monomer or a monomer mixture of "hard" monomers is polymerized. Soft monomers are those which after polymerization form a polymer having a glass transition temperature of −30° C. or less, preferably of −40° C. or less. "Hard" monomers are those which after polymerization form a polymer having a glass transition temperature of more than −10° C., preferably of more than 0° C. The difference between the glass transition temperatures of first stage and second stage ought here to be at least 20° C., preferably at least 30° C.

The amount of the monomers of the second stage is preferably 1% to 10% by weight or 2% to 6% by weight, based on the total amount of all the monomers. In one preferred embodiment, in the $2^{nd}$ stage, methyl methacrylate (Tg 105° C.), methyl acrylate (Tg 22° C.), styrene (Tg 107° C.) or ethyl acrylate (Tg −8° C.) or a mixture thereof is used.

The polymers P1 may be prepared by emulsion polymerization, and are then emulsion polymers, with the above-identified ethylenically unsaturated, radically polymerizable monomers being polymerized by radically initiated emulsion polymerization in water. In order to support the dispersing of the monomers in the aqueous medium, it is possible to use the protective colloids and/or emulsifiers that are commonly employed as dispersants. The monomers of the second stage are added preferably as pure monomers, i.e., not as an emulsion, and without solvents.

A comprehensive description of suitable protective colloids is found in Houben-Weyl, Methoden der organischen Chemie, volume XIV/1, Makromolekulare Stoffe [Macromolecular Compounds], Georg-Thieme-Verlag, Stuttgart, 1961, pages 411 to 420. Suitable emulsifiers include anionic, cationic, and nonionic interface-active substances, whose number-average molecular weight is typically below 2000 g/mol or preferably below 1500 g/mol, whereas the number-average molecular weight of the protective colloids is above 2000 g/mol, as for example from 2000 to 100 000 g/mol, more particularly from 5000 to 50 000 g/mol. As interface-active substances it is preferred to use anionic and nonionic emulsifiers. Suitable emulsifiers are, for example, ethoxylated $C_8$ to $C_{36}$ fatty alcohols having a degree of ethoxylation of 3 to 50, ethoxylated mono-, di-, and tri-$C_4$ to $C_{12}$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one C8-C22 alkyl group. If emulsifiers and/or protective colloids are used as assistants for the dispersing of the monomers, the amounts of them that are used are for example 0.1% to 5% by weight, based on the monomers. Trade names of emulsifiers are, for example, Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, Emulphor NPS 25. The interface-active substance is used typically in amounts of 0.1% to 10% by weight, based on the monomers to be polymerized.

In the emulsion polymerization it is usual to use water-soluble initiators for the radical polymerization of the monomers. Water-soluble initiators for the emulsion polymerization are, for example, ammonium salts and alkali metal salts of peroxydisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems consist of at least one, usually inorganic, reducing agent and an organic or inorganic oxidizing agent. The oxidizing component comprises, for example, the emulsion polymerization initiators already identified above. The reducing components comprise, for example, alkali metal salts of sulfurous acid, such as, for example sodium sulfite, sodium hydrogensulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/Na hydroxymethanesulfinic acid. The individual components, the reducing component for example, may also be mixtures, an example being a mixture of the sodium salt of hydroxymethanesulfinic acid and sodium disulfite. The stated compounds are used usually in the form of aqueous solutions, with the lower concentration being determined by the amount of water that is acceptable in the dispersion, and the upper concentration by the solubility of the respective compound in water. Generally speaking, the concentration is 0.1% to 30% by weight, preferably 0.5% to 20% by weight, more preferably 1.0% to 10% by weight, based on the solution. The amount of the initiators is generally 0.1% to 10% by weight, preferably 0.5% to 5% by weight, based on the monomers to be polymerized. It is also possible for two or more different initiators to be used in the emulsion polymerization.

In the polymerization it is also possible to use polymerization regulators, known as chain transfer agents. Chain transfer agents bring about a chain termination reaction and thereby reduce the molar weight of the polymer. The chain transfer agents are attached to the polymer in this process, generally to the chain end. The amount of the chain transfer agents may amount in particular to 0.05 to 4 parts by weight, more preferably 0.05 to 0.8 part by weight, and very preferably 0.1 to 0.6 part by weight, per 100 parts by weight of the monomers to be polymerized. Suitable chain transfer agents are, in particular, compounds having a mercapto group such as tert-butyl mercaptan, ethyl thioglycolate, mercaptoethynol, mercaptopropyltrimethoxysilane or tert-dodecyl mercaptan. The chain transfer agents are generally low-molecular weight compounds having a molar weight of less than 2000, more particularly less than 1000 g/mol.

The emulsion polymerization takes place in general at 30 to 130, preferably 50 to 90° C. The polymerization medium may be composed alternatively just of water, or of mixtures of water and water-miscible liquids such as methanol, ethanol or tetrahydrofuran. It is preferred to use just water. In the polymerization it is also possible to include a polymer seed in the initial charge for the purpose, for example, of setting the particle size more effectively.

The manner in which the initiator is added to the polymerization vessel in the course of the radical aqueous emulsion polymerization is known to a person of ordinary skill in the art. It may alternatively be included in its entirety in the initial charge to the polymerization vessel, or else used continuously or in stages in accordance with the rate at which it is consumed in the course of the radical aqueous emulsion polymerization. In each individual case, this will be dependent on the chemical nature of the initiator system and on the polymerization temperature. It is preferred to include a portion in the initial charge and to supply the remainder to the polymerization zone at the rate of its consumption. If a molecular weight regulator is used, the regulator, or chain transfer agent, may also be included partly in the initial charge or added wholly or partly during the polymerization or toward the end of the polymerization.

For a high space/time yield of the reactor, dispersions with as high as possible a solids content are preferred. In order to be able to achieve solids contents >60% by weight, a bimodal or polymodal particle size ought to be brought about, since otherwise the viscosity becomes too high, and the dispersion can no longer be handled. Producing a new generation of particles can be done, for example, by adding seed (EP 81 083), by adding excess quantities of emulsifier, or by adding miniemulsions. A further advantage associated with the combination of low viscosity and high solids content is the improved coating behavior at high solids contents. Producing one or more new generations of particles can be done at any desired point in time. This point in time is guided by the particle size distribution that is desired for a low viscosity.

The monomers are preferably added continuously at least partly during the polymerization. In part, monomers may also be introduced as an initial charge in the polymerization vessel before the polymerization is commenced. It is preferred to include not more than 30% by weight of the total amount of the monomers, more preferably not more than 20% by weight, very preferably not more than 10% by weight of the monomers in the initial charge to the polymerization vessel. The remaining monomers, i.e., preferably at least 70% by weight, more preferably at least 80% by weight, very preferably at least 90% by weight, are added continuously during the polymerization. In one particular embodiment, no monomers are included in the initial charge; in other words, the entirety of the monomers is run in during the polymerization. In the case of the feed process, the individual components can be added to the reactor from above, at the side or from below, through the reactor base.

In order to remove the residual monomers it is also possible, after the end of the emulsion polymerization proper, i.e., after a conversion of all of the monomers, to add further initiator (chemical deodorization). In the case of emulsion polymerization, aqueous dispersions of the polymer are obtained generally with solids contents of 15% to 75% by weight, preferably of 40% to 75% by weight. The polymer thus prepared is used preferably in the form of its aqueous dispersion.

The size distribution of the dispersion particles may be monomodal, bimodal or multimodal. In the case of monomodal particle size distribution, the average particle size of the polymer particles dispersed in the aqueous dispersion is preferably less than 400 nm, more particularly less than 300 nm. With particular preference the average particle size lies between 140 and 300 nm. By average particle size here is meant the $d_{50}$ of the particle size distribution, i.e., 50% by weight of the total mass of all the particles have a particle diameter smaller than the $d_{50}$. The particle size distribution can be determined in a known way using the analytical ultracentrifuge (W. Mächtle, Makromolekulare Chemie 185 (1984), pages 1025-1039). In the case of bimodal or multimodal particle size distribution, the particle size can be up to 1000 nm. The pH of the polymer dispersion is set preferably to a pH of more than 4.5, more particularly to a pH of between 5 and 8.

The PSA dispersion of the invention may comprise additives. The additives are selected, for example, from fillers, dyes, flow control assistants, thickeners, preferably associative thickeners, defoamers, plasticizers, pigments, wetting agents, UV protectants, and tackifiers. For improved surface wetting, the PSAs may in particular comprise wetting assistants, examples being fatty alcohol ethoxylates, alkylphenol ethoxylates, sulfosuccinic esters, nonylphenol ethoxylates, polyoxyethylenes/-propylenes or sodium dodecylsulfonates. The amount is generally 0.05 to 5 parts by weight, more particularly 0.1 to 3 parts by weight, per 100 parts by weight of polymer (solid).

Tackifiers are known per se to the skilled person. They are additives for adhesives or elastomers that improve the autoadhesion (tack, intrinsic stickiness, self-adhesion) of these systems. They generally have a relatively low molar mass (Mn about 200-2000 g/mol), a glass transition temperature which lies above that of the elastomers, and sufficient compatibility with the latter; in other words, the tackifiers dissolve at least partly in polymer films formed from the elastomers. The amount by weight of the tackifiers is preferably 5 to 100 parts by weight, more preferably 10 to 50 parts by weight, per 100 parts by weight of polymer (solid/solid). Suitable tackifiers are, for example, those based on natural resins, such as rosins, for example. Tackifiers based on natural resins include the natural resins themselves and also their derivatives formed, for example, by disproportionation or isomerization, polymerization, dimerization or hydrogenation. They may be present in their salt form (with, for example, monovalent or polyvalent counterions (cations)), or, preferably, in their esterified form. Alcohols used for the esterification may be monohydric or polyhydric. Examples are methanol, ethanediol, diethylene glycol, triethylene glycol, 1,2,3-propanetriol, and pentaerythritol. Also finding use as tackifiers, furthermore, are phenolic resins, hydrocarbon resins, e.g., coumarone-indene resins, polyterpene resins, terpene oligomers, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, a-methylstyrene, vinyltoluene. Also being used increasingly as tackifiers are polyacrylates which have a low molar weight. These polyacrylates preferably have a weight-average molecular weight $M_w$ of below 30 000. The polyacrylates are composed preferably to an extent of at least 60%, more particularly at least 80%, by weight of $C_1$-$C_8$ alkyl (meth)acrylates. Preferred tackifiers are natural or chemically modified rosins. Rosins are composed predominantly of abietic acid or derivatives thereof.

PSA dispersions of the invention can be used for producing adhesive articles, or articles which have been rendered self-adhesive. The adhesive article may be a label. A preferred label is a self-adhesive paper label or film label, the adhesive being applied to paper or to a film as carrier material. The adhesive article may also be an adhesive tape, where the adhesive is applied to a tapelike carrier material. The carrier material of the adhesive tape may comprise woven or nonwoven fabrics, films, paper, felts, foams, and coextrudates, or combinations of these. Fields of application are carrierless, single-sided and double-sided adhesive tapes, medical adhesive tapes, adhesive packaging tapes, cable wrapping tapes, carpet laying tapes, adhesive assembly tapes, adhesive tapes for fixing roofing felt sheets, carrier materials which have been rendered self-adhesive, such as foams, for example, bitumen sheets, and the like. The invention accordingly also provides for the use of PSA dispersions of the invention for producing self-adhesive articles, more particularly for producing adhesive tapes for the fixing of components, more particularly in automobile construction, for electronics articles or in construction applications.

For the production of the adhesive articles, a layer of adhesive can be applied to the carrier material in a customary way, as for example by rolling, knife coating, spreading, etc. Where an aqueous adhesive dispersion is used, the water can be removed by drying at 50 to 150° C., for example. The coated substrates thus obtained are used, for example, as self-adhesive articles, such as labels, adhesive tapes or sheets. For this purpose, before or after the adhesive is applied, the carriers can be cut to form adhesive tapes, labels or sheets. For subsequent use, the PSA-coated side of the substrates may be lined with a release paper, such as with a siliconized paper, for example.

The invention also provides an adhesive tape which has at least one carrier layer and is coated on one or both sides with at least one PSA dispersion of the invention. Preferred carrier materials for producing adhesive tapes are polyethylene (PE), oriented polypropylene (oPP), polyethylene terephthalate (PET), PE foam, and polyurethane foam (PU foam).

For the production of adhesive tapes, the application weight of the PSA dispersion, based on solids content, is preferably at least 20 g/m² or at least 30 g/m², e.g., 60 to 80 g/m².

One embodiment of the invention is an adhesive tape where the material of the carrier layer is selected from PE, oPP, PET, PE foam, and PU foam and/or the adhesive tape has at least one detachable protective layer lining the layer of adhesive.

The adhesive articles of the invention have very good adhesive-bonding properties, and particularly a good thermal stability and good water resistance.

EXAMPLES

Materials Used nBA n-butyl acrylate
EHA 2-ethylhexyl acrylate
MMA methyl methacrylate
MA methyl acrylate
UMA ureidomethacrylate (2-(2-oxoimidazolidin-1-yl) ethyl methacrylate)
AA acrylic acid
HPA 2-hydroxypropyl acrylate
VAc vinyl acetate
Seed 30 nm styrene seed Performance Tests:

The PSAs were coated with a coat weight of 75 g/m² onto Hostaphan® RN 36 PET film as carrier, and dried at 90° C. for 5 minutes. The PSA-coated carrier was slit to give test strips 25 mm wide.

a) Shear Strength

For the determination of the shear strength, the test strips were adhered with a bonded area of 25×25 mm to sheet steel, rolled on once with a roller weighing 1 kg, and then loaded in suspension with a 1 kg weight. The shear strength (cohesion) was determined under standard conditions (23° C.; 50% relative humidity) and at 70° C. The measure of the shear strength is the time, in hours, taken for the weight to fall off; in each case, the average was calculated from 5 measurements.

b) S.A.F.T. Test

The test strips were adhered with a bonded area of 25×25 mm to AFERA steel, rolled on 4 times using a roller weighing 2 kg, and, after a contact time of at least 16 hours, loaded in suspension with a 1 kg weight. In the course of loading, heating took place continuously, starting from 23° C., at a rate of 0.5° C./min. The heating temperature reached at the point when the weight fell off is a measure of the thermal stability of the adhesive. In each case the average was calculated from three measurements.

c) Water Resistance

For measuring the water resistance of the adhesive bonds, the anchorage of substrate coated with the PSA under test to a 30 μm aluminum foil after storage in water was tested. The application rate of the adhesive is 40 g/m². The measure of the water resistance is the time after which the substrate can be removed from the aluminum support by rubbing.

Example 1

Noninventive PSA dispersions D1 to D3 were prepared by single-stage emulsion polymerization from the monomer compositions shown in Table 1.

TABLE 1

Monomer compositions for preparing the PSA dispersions D1 to D3, amounts in parts by weight

|  | D1 | D2 | D3 |
|---|---|---|---|
| Seed | 0.4 | 0.4 | 0.4 |
| nBA | 87.75 | 87.75 | 87.75 |
| MMA | 7.8 | 6.8 | 5.85 |
| UMA | — | 1.0 | 1.95 |
| AA | 1.5 | 1.5 | 1.5 |
| Styrene | 1.0 | 1.0 | 1.0 |
| HPA | 1.95 | 1.95 | 1.95 |

The test results for shear strength and thermal stability are summarized in Table 2.

TABLE 2

Test results D1-D3

|  | Shear strength 23° C. [hours] | Shear strength 70° C. [hours] | S.A.F.T. test | Water resistance |
|---|---|---|---|---|
| D1 (no UMA) | 0.7 | 0.1 | 38° C. | 1.5 h |
| D2 (1 pphm UMA) | >100 | 8.2 | 121° C. | 1.5 h |
| D3 (2 pphm UMA) | >100 | 4.8 | 121° C. | 1.5 h | pphm: parts per hundred parts monomer; parts by weight per 100 parts by weight of monomer The water resistance is not improved by adding monomer b). The results show that using a monomer of type b) results in an adhesive with improved thermal stability.

Example 2

A noninventive PSA dispersion D4 was prepared in one stage and inventive PSA dispersions D5 and D6 were prepared in two stages by emulsion polymerization from the monomer compositions shown in Table 3.

TABLE 3

Monomer compositions for preparing the PSA dispersions D4 to D6, amounts in parts by weight

|  | D4 | D5 | D6 |
|---|---|---|---|
| 1st Stage |  |  |  |
| Seed | 0.4 | 0.4 | 0.4 |
| nBA | 87.75 | 87.75 | 87.75 |
| MMA | 6.825 | 2.925 | 2.925 |
| UMA | 0.975 | 0.975 | 0.975 |
| AA | 1.5 | 1.5 | 1.5 |
| Styrene | 0.9 | 1 | 1 |
| HPA | 1.95 | 1.95 | 1.95 |
| 2nd Stage |  |  |  |
| MMA | — | 3.9 | — |
| EA | — | — | 3.9 |

The test results of the shear strength, thermal stability, and water resistance are summarized in Table 4.

TABLE 4

Test results D4-D6

|  | Shear strength 23° C. [hours] | Shear strength 70° C. [hours] | S.A.F.T. test | Water resistance |
|---|---|---|---|---|
| D4 (single-stage) | >100 | 8.2 | 120° C. | 1.5 h |
| D5 (two-stage) | >100 | 19.3 | 116° C. | >4 d |
| D6 (two-stage) | >100 | 11.0 | 112° C. | >4 d |

The results show that a two-stage polymerization results in a significantly improved water resistance on the part of the adhesive.

Example 3

Further examples of composition and mode of preparation of inventive PSA dispersions are shown in Table 5.

TABLE 5

Monomer compositions for preparing the PSA dispersions D7 to D26, amounts and parts by weight

|  | D7 | D8 | D9 | D10 | D11 | D12 | D13 | D14 |
|---|---|---|---|---|---|---|---|---|
| 1st stage |  |  |  |  |  |  |  |  |
| nBA | 87.5 | 87.5 | 87.5 | 87.5 |  |  |  |  |
| EHA |  |  |  |  | 58 | 58 | 58 | 58 |
| MMA | 3 | 3 | 3 | 3 | 3 | 3 | 3 | 3 |
| EA |  |  |  |  | 29.5 | 29.5 | 29.5 | 29.5 |
| UMA | 1 | 1 | 1 | 1 | 1 | 1 | 1 | 1 |
| AA | 1.5 | 1.5 | 1.5 | 1.5 | 1.5 | 1.5 | 1.5 | 1.5 |
| Styrene | 1 | 1 | 1 | 1 | 1 | 1 | 1 | 1 |
| HPA | 2 | 2 | 2 | 2 | 2 | 2 | 2 | 2 |
| 2nd stage |  |  |  |  |  |  |  |  |
| EA | 4 |  |  |  | 4 |  |  |  |
| MA |  | 4 |  |  |  | 4 |  |  |
| Styrene |  |  | 4 |  |  |  | 4 |  |
| MMA |  |  |  | 4 |  |  |  | 4 |

|  | D15 | D16 | D17 | D18 | D19 | D20 | D21 | D22 |
|---|---|---|---|---|---|---|---|---|
| 1st stage |  |  |  |  |  |  |  |  |
| nBA |  |  |  |  |  |  |  |  |
| EHA | 66.5 | 66.5 | 66.5 | 66.5 | 69.5 | 69.5 | 69.5 | 69.5 |
| MMA | 3 | 3 | 3 | 3 | 3 | 3 | 3 | 3 |
| MA | 21 | 21 | 21 | 21 | 29.5 | 29.5 | 29.5 | 29.5 |
| VAc |  |  |  | 18 | 18 | 18 | 18 |  |
| UMA | 1 | 1 | 1 | 1 | 1 | 1 | 1 | 1 |
| AA | 1.5 | 1.5 | 1.5 | 1.5 | 1.5 | 1.5 | 1.5 | 1.5 |
| Styrene | 1 | 1 | 1 | 1 | 1 | 1 | 1 | 1 |
| HPA | 2 | 2 | 2 | 2 | 2 | 2 | 2 | 2 |
| 2nd stage |  |  |  |  |  |  |  |  |
| EA | 4 |  |  |  | 4 |  |  |  |
| MA |  | 4 |  |  |  | 4 |  |  |
| Styrene |  |  | 4 |  |  |  | 4 |  |
| MMA |  |  |  | 4 |  |  |  | 4 |

|  | D23 | D24 | D25 | D26 |
|---|---|---|---|---|
| 1st stage |  |  |  |  |
| nBA | 87.5 |  |  |  |
| EHA |  | 58 | 66.5 | 66.5 |
| MMA | 3 | 3 | 3 | 3 |
| MA |  |  | 21 |  |
| VAc |  |  |  | 18 |
| EA |  | 29.5 |  |  |
| UMA | 1 | 1 | 1 | 1 |
| AA | 1.5 | 1.5 | 1.5 | 1.5 |
| Styrene | 1 | 1 | 1 | 1 |
| HPA | 2 | 2 | 2 | 2 |
| 2nd stage |  |  |  |  |
| nBA | 2 | 2 | 2 | 2 |
| EA |  |  |  |  |
| MA |  |  |  |  |
| Styrene | 2 | 2 | 2 | 2 |
| MMA |  |  |  |  |

It was found that the shelf-life of the adhesive laminates can be significantly enhanced if more than 1% by weight of (meth)acrylate monomers b) is used for the polymerization. Thus, for example, use of 2 parts by weight of UMA instead of 1 part by weight leads to an increase in the shear strength (measured at 23° C. after 1-day storage at 70° C.) from about 45 hours (1% by weight of UMA) to levels of more than 100 hours (2% by weight of UMA).

The invention claimed is:

1. A pressure-sensitive adhesive dispersion, comprising:
   a water-dispersed polymer P1 formed by emulsion polymerization from a monomer mixture,
   wherein the monomer mixture comprises
   (a) 60 to 95% by weight of a C4 to C8 alkyl (meth)acrylate which, when polymerized as a homopolymer, has a glass transition temperature of −30° C. or less,
   (b) 0.5 to 5% by weight of 2-(2-oxoimidazolidin-1-yl)ethyl methacrylate, and
   (c) 0.5 to 4% by weight of an acid monomer selected from the group consisting of acrylic acid, methacrylic acid and combinations thereof, and
   (d) 1 to 40% by weight of one or more further monomers selected from the group consisting of a C1 to C20 alkyl (meth)acrylate, a C1 to C20 hydroxyalkyl (meth)acrylate, a vinyl ester of a carboxylic acid comprising up to 20 C atoms, a vinylaromatic having up to 20 C atoms, an ethylenically unsaturated nitrile, a vinyl halide, a vinyl ester of an alcohol comprising 1 to 10 C atoms, an aliphatic hydrocarbon having 2 to 8 C atoms and one or two double bonds, and a mixture thereof,
   monomer amounts being based in each case on a sum of all monomers,
   wherein the polymer P1 is prepared by a process comprising a first polymerizing stage and a second polymerizing stage, wherein the entire amount of the 2-(2-oxoimidazolidin-1-yl)ethyl methacrylate in the monomer mixture is polymerized during the first polymerization stage, and
   a glass transition temperature of a polymer from monomers of the first polymerizing stage is at least 20° C. lower than a glass transition temperature of a polymer from monomers of the second polymerizing stage.

2. The pressure-sensitive adhesive dispersion according to claim 1, wherein (a) is at least one selected from the group consisting of n-butyl acrylate, n-hexyl acrylate, octyl acrylate, and 2-ethylhexyl acrylate.

3. The pressure-sensitive adhesive dispersion according to claim 1, wherein the one or more further monomers (d) is present in an amount of 2% to 30% by weight.

4. The pressure-sensitive adhesive dispersion according to claim 1, wherein the pressure-sensitive adhesive dispersion comprises an additive selected from the group consisting of a filler, a dye, a flow control assistant, a thickener, a defoamer, a plasticizer, a pigment, a wetting agent, a UV protectant, and a tackifier.

5. The pressure-sensitive adhesive dispersion according to claim 1, wherein the glass transition temperature of a polymer from monomers of the first polymerizing stage is less than or equal to −30° C. and
the glass transition temperature of a polymer from monomers of the second polymerizing stage is more than −10° C.

6. The pressure-sensitive adhesive dispersion according to claim 1, wherein the glass transition temperature of a polymer from monomers of the first polymerizing stage is less than or equal to −40° C. and
the glass transition temperature of a polymer from monomers of the second polymerizing stage is more than 0° C.

7. An adhesive tape, comprising a carrier layer, wherein the adhesive tape is coated on one or both sides with at least one of the pressure-sensitive adhesive dispersion according to claim 1.

8. The adhesive tape according to claim 7, wherein an applied weight of the pressure-sensitive adhesive dispersion, based on solids content, is at least 30 g/m$^2$.

9. The adhesive tape according to claim 7, wherein the carrier layer is selected from the group consisting of polyethylene, oriented polypropylene, polyethylene terephthalate, PE foam, and polyurethane foam,
the adhesive tape further comprises a detachable protective layer lining a layer of adhesive,
or both.

10. A method for producing a self-adhesive article, the method comprising:
producing the self-adhesive article with the pressure-sensitive adhesive dispersion according to claim 1.

11. A method for fixing a component for an electronics article or in a construction application, the method comprising:
fixing the component with the pressure-sensitive adhesive dispersion according to claim 1.

12. The method according to claim 11, wherein the component is suitable for automobile construction.

13. A method for fixing a component for an electronics article or in a construction application, the method comprising:
fixing the component with the adhesive tape according to claim 7.

14. The method according to claim 13, wherein the component is suitable for automobile construction.

15. The pressure-sensitive adhesive dispersion according to claim 1, wherein the 2-(2-oxoimidazolidin-1-yl)ethyl methacrylate (b) is present in an amount of 1 to 5% by weight in the polymer P1.

16. The pressure-sensitive adhesive dispersion according to claim 1, wherein the monomer (d) is at least one selected from the group consisting of styrene, vinyl acetate, and 2-hydroxypropyl acrylate.

17. The pressure-sensitive adhesive dispersion according to claim 1, wherein the second polymerizing stage is carried out with at least one co-monomer (d) selected from the group consisting of styrene, ethyl acrylate, methyl acrylate and methyl methacrylate to form a particle.

18. The pressure-sensitive adhesive dispersion according to claim 1, wherein the second polymerizing stage is carried out with a monomer mixture consisting of one or more monomers selected from the group consisting of ethyl acrylate, methyl methacrylate, methacrylic acid and styrene.

19. The pressure-sensitive adhesive dispersion according to claim 1, wherein the 2-(2-oxoimidazolidin-1-yl)ethyl methacrylate (b) is present in an amount of from 0.5% by weight to 2% by weight based on the total weight of the monomer mixture.

20. The pressure-sensitive adhesive dispersion according to claim 19, wherein the 2-(2-oxoimidazolidin-1-yl)ethyl methacrylate (b) is present in an amount of from 1 to 2% by weight based on the total weight of the monomer mixture.

21. The pressure-sensitive adhesive dispersion according to claim 1, wherein the monomer mixture consists of n-butyl acrylate, 2-(2-oxoimidazolidin-1-yl)ethyl methacrylate, methyl methacrylate, hydroxypropyl acrylate, acrylic acid, styrene and ethyl acrylate.

22. The pressure-sensitive adhesive dispersion according to claim 1, wherein the first polymerizing stage is carried out by polymerizing a monomer mixture consisting of n-butyl acrylate, 2-(2-oxoimidazolidin-1-yl)ethyl methacrylate, methyl methacrylate, hydroxypropyl acrylate, acrylic acid and styrene.

23. The pressure-sensitive adhesive dispersion according to claim 1, wherein during the first stage polymerization a first monomer mixture consisting of (a) n-butyl acrylate, (b) 2-(2-oxoimidazolidin-1-yl)ethyl methacrylate, (c) acrylic acid and (d) methyl methacrylate, hydroxypropyl acrylate, and styrene is polymerized to form a first polymer; during the second stage polymerization ethyl acrylate is polymerized in the presence of the first polymer; and the polymer P1 consists of (a) 75-90% by weight of n-butyl acrylate, (b) 1 to 2% by weight of 2-(2-oxoimidazolidin-1-yl)ethyl methacrylate, (c) 0.5 to 2% by weight of acrylic acid and (d) 2 to 20% by weight of monomers selected from the group consisting of methyl methacrylate, ethyl acrylate and hydroxypropyl acrylate, wherein % by weight is based on the total weight of the polymerized monomers in the polymer P1.

* * * * *